Patented June 14, 1927.

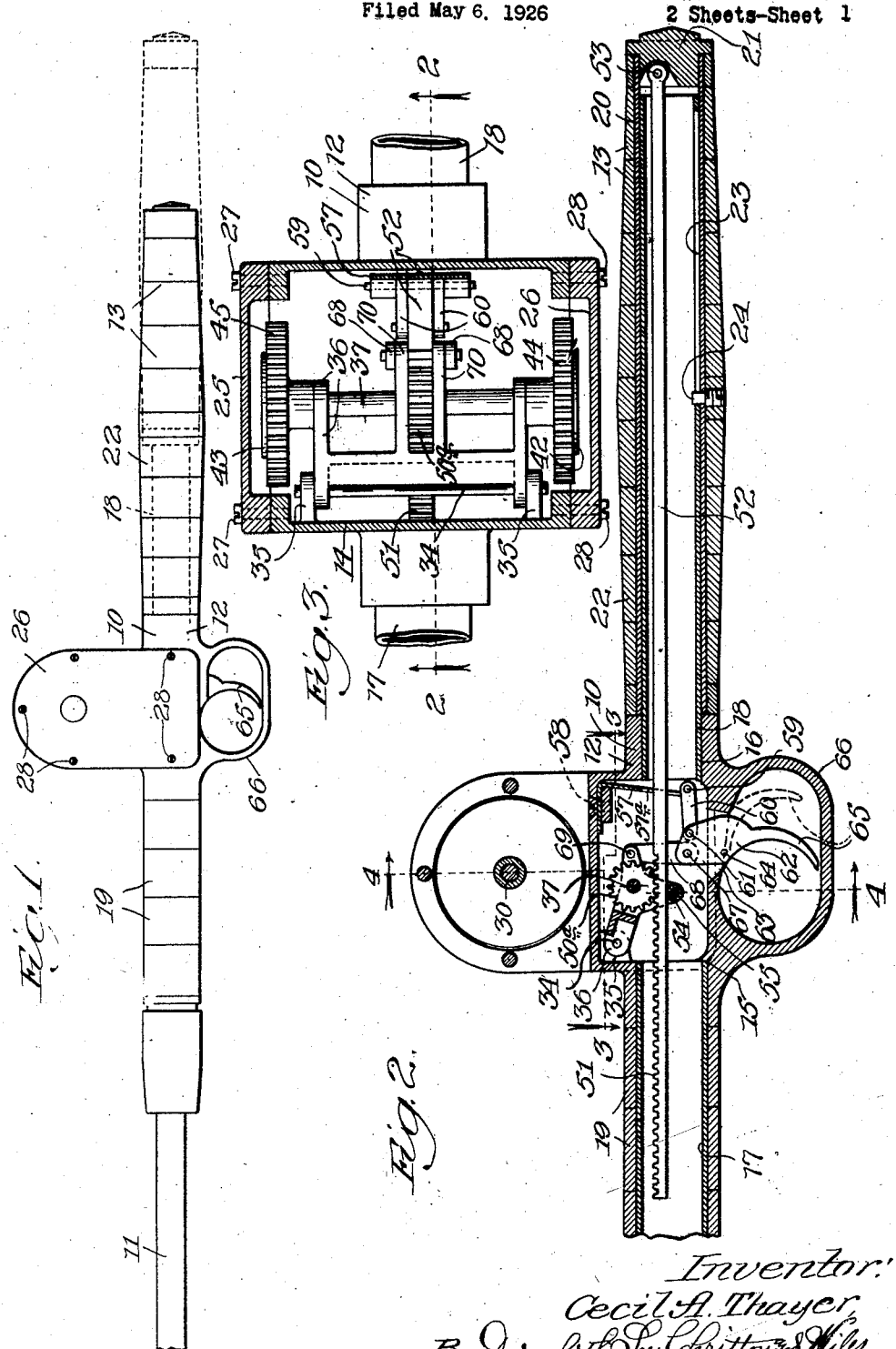

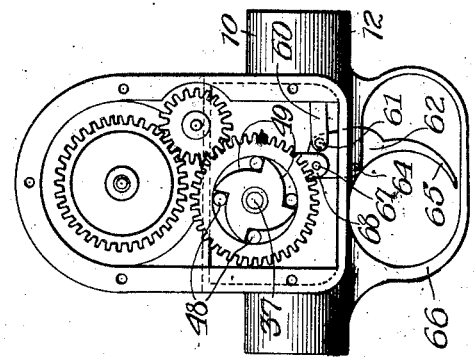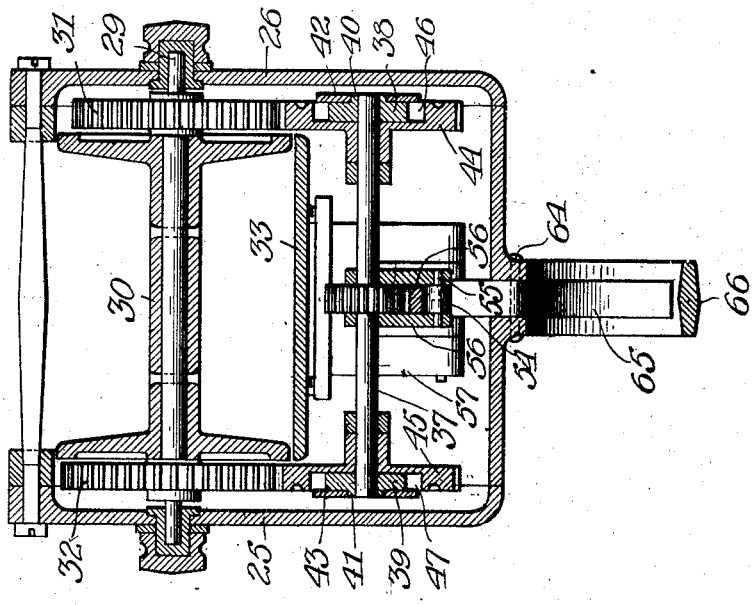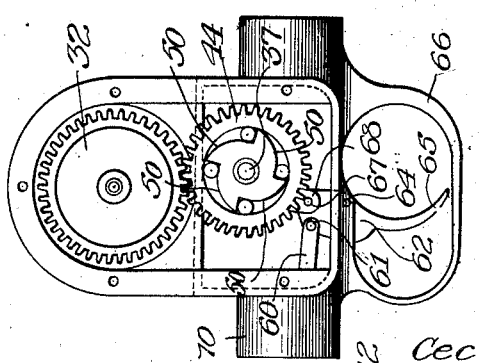

1,632,522

UNITED STATES PATENT OFFICE.

CECIL A. THAYER, OF GARY, INDIANA.

FISHING REEL.

Application filed May 6, 1926. Serial No. 107,248.

My objects, generally stated, are to provide improvements in fishing reels, to the end that the operator shall have more effective control of the line, in the various operations performed in using a fishing rod.

Certain of my more particular objects are to provide in a reel of the reciprocable-rack type, particularly in those constructions wherein the rack is operated by reciprocating a portion of the handle gripped by the user, for the effective and accurate control of the unwinding of the line from the spool, as for example in casting the line, or paying it out under the pull exerted thereon by a hooked fish, and the rewinding thereof particularly during the operation of "playing" the fish; to provide in a reel of the type wherein the driving means for the spool are movable into and out of driving position, for such an arrangement of parts that the user may "thumb" the line, as in the case of the common form of reels, for controlling the unwinding of the line from the spool and accurately control the rewinding thereof, and to accomplish such operations particularly in a structure wherein the spool is operated by reciprocating a section of the handle grasped by the operator in using the rod; and to provide for the releasing of the spool to permit the line to unwind therefrom, while maintaining the most advantageous grip on the handle for ensuring control of the rod and reel by the user particularly in the "playing" of a fish in which operation it is usually essential that the line be permitted to pay out and be rewound alternately, by quick successive movements while the user maintains a firm grip on the rod.

Referring to the accompanying drawings:—

Figure 1 is a view in side elevation of the handle-equipped portion of a fishing rod provided with my improved reel. Figure 2 is an enlarged view in longitudinal sectional elevation of a portion of the structure shown in Fig. 1, this view being taken at a line corresponding with the line 2—2 on Fig. 3 and viewed in the direction of the arrows. Figure 3 is a plan sectional view of the structure of the preceding figures, the section being taken at the irregular line 3—3 on Fig. 2 and viewed in the direction of the arrows. Figure 4 is an enlarged view in sectional elevation taken through the reel and handle portion, the section being taken at the irregular line 4—4 on Fig. 2 and viewed in the direction of the arrows; and Figures 5 and 6, are views in elevation of the opposite end portions of the reel, with the end cover plates removed, both of these views being reduced as compared with Fig. 4.

In the illustrated embodiment of my invention the handle portion of a fishing rod is represented generally at 10, this handle portion being connected, in any suitable way, as for example as in the case of fishing rods as commonly provided, with the rear end of the main portion 11 of the rod. The handle portion 10 is formed of two main sections 12 and 13, the portion 12 comprising a hollow casing section 14 containing openings 15 and 16 in opposed walls thereof and tubular members 17 and 18 rigidly secured in the openings 15 and 16, the member 17 being shown as sheathed at 19 with any suitable friction material, as for example cork, and into which the sectional rod portion 11 extends and is rigidly secured. The other main section 13 of the handle comprises a tube 20 which is telescoped with the tube 18 and has sliding fit thereon to permit the former to be reciprocated on the tube 18. The rear end of the tube 20 contains a plug 21 and is sheathed, as represented at 22 with any suitable friction material as explained of the tube 17, the tube 18 containing a slot 23 extending lengthwise thereof into which a stud 24 provided on the tube 20 extends, permitting the section 13 to be reciprocated as stated, while preventing relative rotation of this section on the tube 18.

The handle section 14, together with side plates 25 and 26 secured at the open ends of this section, as by screws 27 and 28, forms a housing for parts of the reel, which latter comprises a shaft 29 located in the section 12 to extend crosswise of the longitudinal axis of the handle portion 10 and wholly above this portion, as shown, this shaft having rigidly secured thereto between its ends a spool 30, and adjacent its ends gears 31 and 32, the section 12 being provided with a partition plate 33 located immediately below the spool 30. Pivoted on a shaft 34 paralleling the shaft 29, and mounted in lugs 35 on the front wall of the section 12, is a frame-like member 36 in which a shaft 37 is journalled, this shaft having rigidly secured thereto at its ends plural cam disks 38 and 39 forming elements of cam and roller clutches, the outer faces of the disks 38 and 39 being provided with hubs 40 and 41, respectively, to which washers 42 and 43 of substantially the same diameter as the disks 38 and 39, are rigidly secured. Rotatably mounted on the shaft 37 at points between the disks 38 and 39 are gears 44 and 45, which are so spaced that when the frame 36 is in the raised position shown in the drawings, they will mesh, respectively, with an intermediate gear 31$^a$ journalled on the section 12 and constantly meshing with the gear 31, and with the gear 32, the outer faces of the gears 44 and 45 containing recesses 46 and 47, respectively, in which the cam disks 38 and 39, respectively, extend. The rollers which form another element of the cam and roller clutch mechanisms referred to, are represented at 48, these rollers being located within the recesses 46 and 47 adjacent the receding end portions of each of the cams 49 and 50 provided peripherally on the disks 38 and 39, respectively, the cams on these two disks being reversely disposed, whereby when the shaft 37 is rotated in clockwise direction in Fig. 2, as by the means hereinafter described, the clutch formed of the disk 38, rollers 48, and gear 44 will be in driving condition and thereby rotate the spool 30 through the gears 44, 31$^a$, and 31, and the clutch at the opposite end of the shaft 37 will be inoperative, and when the shaft 37 is rotated in counterclockwise direction in Fig. 2 the clutch first referred to will be inoperative and the other clutch operative, and rotate the spool 30 in the same direction as that previously described.

The shaft 37 is also provided with a pinion 50$^a$ rigid thereon intermediate its ends which meshes with the rack-portion 51 of a rod 52 which extends lengthwise in the handle portion and is pivotally connected at its rear end, as represented at 53, to the plug 21, the forward end of the rod 52 resting on a roller 54 journalled on a shaft 55 secured in depending ears 56 formed as a part of the frame 36, the rack thus provided serving, in the reciprocation of the handle section 13 relative to the handle section 12, as a means for successively rotating the shaft 37 in opposite directions and thereby drive the spool 30 unidirectionally for winding upon it the line which would be secured to the spool.

The member 36 is yieldingly maintained in raised position for effecting drive of the spool through the means carried on this frame, by a spring 57 secured at its upper end to the handle section 12, as by the screw 58. The lower end of the spring 57 is bifurcated to provide the arms 57$^a$ which straddle the rack 51, the lower ends of the arms 57$^a$ being pivotally connected at 59 with the ends of links 60, the opposite ends of which are pivotally connected at 61 with a trigger 62 extending through an opening 63 in the bottom of the casing-section 14 and pivoted to this section, as indicated at 64, the finger-grip portion 65 of this trigger extending into a trigger-guard extension 66 depending from the casing-section 14. The trigger 62 is pivotally connected at its upper end, as indicated at 67, with the lower ends of links 68, the upper ends of which are pivoted on a pin 69 secured in spaced ears 70 forming a part of the frame 36. The portion of the trigger 62 above the pivot 64, and the links 68 form, in effect, a toggle adjacent to the joint 67 of which, the links 60 are connected with the trigger at 61, the spring 57 exerting pressure tending to hold these parts in the position shown in Fig. 2 in which the gears 44 and 45 on the frame 36 bottom on the gears 31$^a$ and 32, respectively. The lowering of the frame 36 to disengage the driving mechanism from the gears 31 and 32 is effected by rocking the trigger 62 to the dotted line position shown in Fig. 2 which results in the breaking of the toggle referred to, in opposition to the action of the spring 57.

A general description of the operation of the structure described, is as follows:

Assuming that the trigger is in the position shown by full lines in Fig. 2 which is the normal position of this part, reciprocation of the handle section 13 operates to reciprocate the rack bar 52 thereby rotating the shaft 37 first in one direction and then in the other with the result of driving the spool 30 unidirectionally for winding the line thereon, and when it is desired to release the driving mechanism from the spool, the operator moves the trigger 62 to the dotted line position shown in Fig. 2 thereby permitting the spool to rotate freely and permit the line to be unwound therefrom.

The incorporation in a fishing rod of the various features above described are of great practical importance and permit of the rod being handled with the greatest facility not only in the casting of the line, but also in the playing and landing of a hooked fish. The provision of the handle portion at opposite sides of the reel section and the arrangement of the spool to extend at an axis transverse to the longitudinal axis of the handle portion and above the same and the location of the trigger at the opposite side of the handle portion, permits the user to grasp with one hand the handle portion in front of the reel and to grasp with the other hand the handle portion at the other side of the reel thereby permitting the user to grip the rod most effectively. With the grip thus established the user, by reciprocating the handle portion 13, without disturbing his grip thereon, may wind the line upon the spool, and without releasing such grip may readily actuate the trigger 62, to permit the paying out of the line without resistance to its movement, and by releasing pressure on the trigger the driving connection between the handle section 13 and the spool is automatically reestablished to again wind the line on the spool by reciprocating the section 13, all this being capable of accomplishment, while the operator retains a firm grip on the rod with both hands thus ensuring perfect control of the rod, which is especially desirable in the "playing" of a hooked fish.

It will also be noted that by the arrangement of the spool as above referred to, the operator while maintaining a firm grip on the handle portion 13, and actuating the trigger 62 by one of the fingers of this gripping hand, may throw the line, as in casting, while having perfect thumbing control of the spool as in the case of the ordinary reel thereby enabling the user to accurately control the running of the spool, to suit the different conditions of casting, it being understood that the spool must be stopped at the proper time, depending on the speed at which it is rotated, in order to avoid over-running of the spool and consequent back-lashing of the line on the spool.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. A fishing-reel comprising, in combination, a supporting structure, a spool journalled thereon, a reciprocable rack, and means in driving engagement with said rack for rotating said spool and mounted to be swung into and out of a position for rotating said spool.

2. A fishing-reel comprising, in combination, a supporting structure, a spool journalled thereon, a reciprocable rack, and trigger-controlled means in driving engagement with said rack for rotating said spool and mounted to be swung into and out of a position for rotating said spool.

3. A fishing-reel, comprising, in combination, a supporting structure, a spool journalled thereon, a reciprocable rack, a movably supported member, a gear on said member meshing with said rack, a pair of gears rotatable on said member through which said spool is rotated, an intermediate gear interposed between said spool and one of said pair of gears, and one-way driving mechanisms through which said first-named gear alternately drives said pair of gears, respectively, in the reciprocations of said rack, said second-named member being movable into and out of a position in which the gears thereon are in driving engagement with said spool.

4. A fishing-reel, comprising, in combination, a supporting structure, a spool journalled thereon, a reciprocable rack, a movably supported member, a gear on said member meshing with said rack, a pair of gears rotatable on said member and through which said spool is rotated, an intermediate gear interposed between said spool and one of said pair of gears, one-way driving mechanisms through which said first-named gear alternately drives said pair of gears, respectively, in the reciprocations of said rack, said second-named member being movable into and out of a position in which the gears thereon are in driving engagement with said spool, and means controlling the position of said second-named member comprising a spring normally holding said second-named member in a position for rotating said spool and a finger-controlled element for moving said second-named member against the resistance of said spring and out of spool-driving position.

5. In a fishing-rod, the combination with its handle-portion adapted to be grasped by the operator, of a fishing-reel comprising a spool rotatably mounted on said handle-portion with its axis of rotation extending crosswise of the longitudinal axis of the handle and in non-intersecting relation to said handle, a reciprocable rack on the handle, and means operated by said rack for rotating said spool.

6. In a fishing-rod, the combination with its handle portion adapted to be grasped by the operator, of a fishing reel comprising a spool rotatably mounted on said handle portion with its axis of rotation extending crosswise of the longitudinal axis of the handle and in non-intersecting relation to said handle and in position to permit the user to press his thumb against the line on the reel for "thumbing" the line with the hand grasping said handle portion, a reciprocable rack on the handle, and means operated by said rack for rotating said spool, the butt end of said handle being formed of sections relatively movable in the direction of length of the handle, the movable one of said sections operatively engaging said rack for reciprocating it.

7. In a fishing-rod, the combination with its handle-portion adapted to be grasped by the operator, of a fishing-reel comprising a spool rotatably mounted on said handle-portion and extending crosswise thereof in position to permit the user to "thumb" the line on the reel with the hand grasping said handle portion, a reciprocable rack in the handle, and means operated by said rack for rotating said spool, said means being movable into and out of driving engagement with said spool, and trigger-mechanism located at the side of said handle-portion opposite to that at which said spool is located, for controlling the positioning of said means.

8. In a fishing-rod, the combination with its handle-portion adapted to be grasped by the operator, of a fishing-reel comprising a spool rotatably mounted on said handle-portion with its axis of rotation extending crosswise of the longitudinal axis of the handle and in non-intersecting relation to said handle, a reciprocable rack in the handle, and means operated by said rack for rotating said spool, said means being movable into and out of driving engagement with said spool, and trigger-mechanism located at the side of said handle-portion opposite to that at which said spool is located, for controlling the positioning of said means.

9. In a fishing-rod, the combination with its handle-portion adapted to be grasped by the operator, said handle-portion being formed of sections, one of which is slidable on the other lengthwise of said handle, of a fishing-reel comprising a spool rotatably mounted on the stationary one of said sections with its axis of rotation extending crosswise of the longitudinal axis of the handle and located above the handle, a reciprocable rack in said handle and operatively engaging said movable section of the handle, a member movably supported on said handle, means carried by said movable member and operatively engaging said rack and operating when said movable member is in one position to effect driving of said spool by reciprocating said rack and being out of driving engagement therewith when moved out of said position, and means controlling the position of said movable member comprising a spring operating to normally hold said movable member in a position for driving said spool, and a trigger-device extending beyond the side of said handle opposite that at which said spool extends, for shifting said movable member against the action of said spring, out of spool-driving position.

CECIL A. THAYER.